United States Patent [19]

Cherrey

[11] 4,011,544
[45] Mar. 8, 1977

[54] CONTROL SYSTEM HAVING A PROGRAMMED LOGIC UNIT

[75] Inventor: Antoine Cherrey, Paris, France

[73] Assignee: Compagnie Industrielle des Telecommunications Cit-Alcatel, Paris, France

[22] Filed: Dec. 13, 1974

[21] Appl. No.: 532,575

[30] Foreign Application Priority Data

Dec. 20, 1973 France ............................ 73.45708

[52] U.S. Cl. ...................... 340/172.5; 179/175.2 C
[51] Int. Cl.² .................... G05B 11/32; G06F 3/00
[58] Field of Search .......... 340/172.5; 179/175.2 C

[56] References Cited

UNITED STATES PATENTS

| | | | |
|---|---|---|---|
| 3,648,252 | 3/1972 | Thron | 340/172.5 |
| 3,740,728 | 6/1973 | Pullen | 340/172.5 |
| 3,753,243 | 8/1973 | Ricketts, Jr. et al. | 340/172.5 |
| 3,883,851 | 5/1975 | Drake et al. | 340/172.5 |

FOREIGN PATENTS OR APPLICATIONS 1,403,636 8/1963 France

OTHER PUBLICATIONS

International Conference on Microelectronics, IEE, June 3-5, 1969, Eastborne, London, pp. 33-34.

*Primary Examiner*—Gareth D. Shaw
*Assistant Examiner*—C. T. Bartz
*Attorney, Agent, or Firm*—Sughrue, Rothwell, Mion, Zinn & Macpeak

[57] ABSTRACT

Programmed logic control system intended for the monitoring of a set of elements, more particularly a switching exchange comprising an addressable memory containing the list of orders enabling the said monitoring, input detectors receiving the data concerning the state of the various controlled elements, registers for storing the data used by the program, output means enabling the sending, towards the elements, of orders for the changing of state and/or digital data contained in the registers and means for addressing the memory effecting an analysis according to a logic unit comprising several states of the input data.

5 Claims, 4 Drawing Figures

CONTROL SYSTEM HAVING A PROGRAMMED LOGIC UNIT

BACKGROUND OF THE INVENTION

The present invention concerns a control system having a programmed logic unit capable of controlling a set of machines or of elements. It may be applied more particularly in telecommunications for controlling switching exchanges.

In the known technique, the controlling of a set of elements is effected either by wired logic equipment units and it is hence less centralized and much more rigid, or by a computer whose bulk is great and whose price is high, especially when that computer has to be duplicated for reliability reasons.

SUMMARY OF THE INVENTION

The aim of the invention is to produce, without the assistance of a computer, a flexible control of such sets, making it possible to insert easily new operational cases and to increase, due to its rapidity of action, the number of cases which may be handled. That result may be obtained with means taking up a very small space and having a low cost.

The control system which is the object of the invention comprises a direct access memory containing the program, that is, the list of the orders which may be given by the control system to the various elements of the controlled assembly. The means for connecting the program with the various elements and with the outside are grouped around that memory. A group of detectors makes it possible to analyse the states or the data transmitted by the various elements. A certain number of registers enable the storing of the digital data used at a given instant. Means for addressing the memory make it possible to effect an analysis, according to a logic unit having several states, of the input data.

An order generator decodes and transmits to the element concerned the order read in the memory, which may be an order for reading a detector, an order for the output of a data item contained in a register or a direct order to an element. At the outputs of the registers, the data is directed towards the elements by a group of distributors. The inserting of the program into the memory is effected by an operation console which also enables outside controlling in the effecting of the program.

The system according to the invention makes it possible to dispense with a computer due to the fact that, being used only for transmitting data or orders to elements and not requiring, consequently, any calculating element, it does not use a binary logic element but a logic element having several states which enables the analysing of input data into a very small number of logic stages. This result is obtained by the fact that on one hand, each memory line comprises a line order and a line number to which is added, in a simple adder, an increment determined by the validation circuit so as to determine the address of the following order which is also completely independent from that of the order being read.

BRIEF DESCRIPTION OF THE DRAWINGS

An embodiment of the invention, relating to a telephone exchange central control marker, is described by way of an example having no limiting character and with reference to the accompanying drawings.

DESCRIPTION OF THE PREFERRED EMBODIMENT

Figure 1:
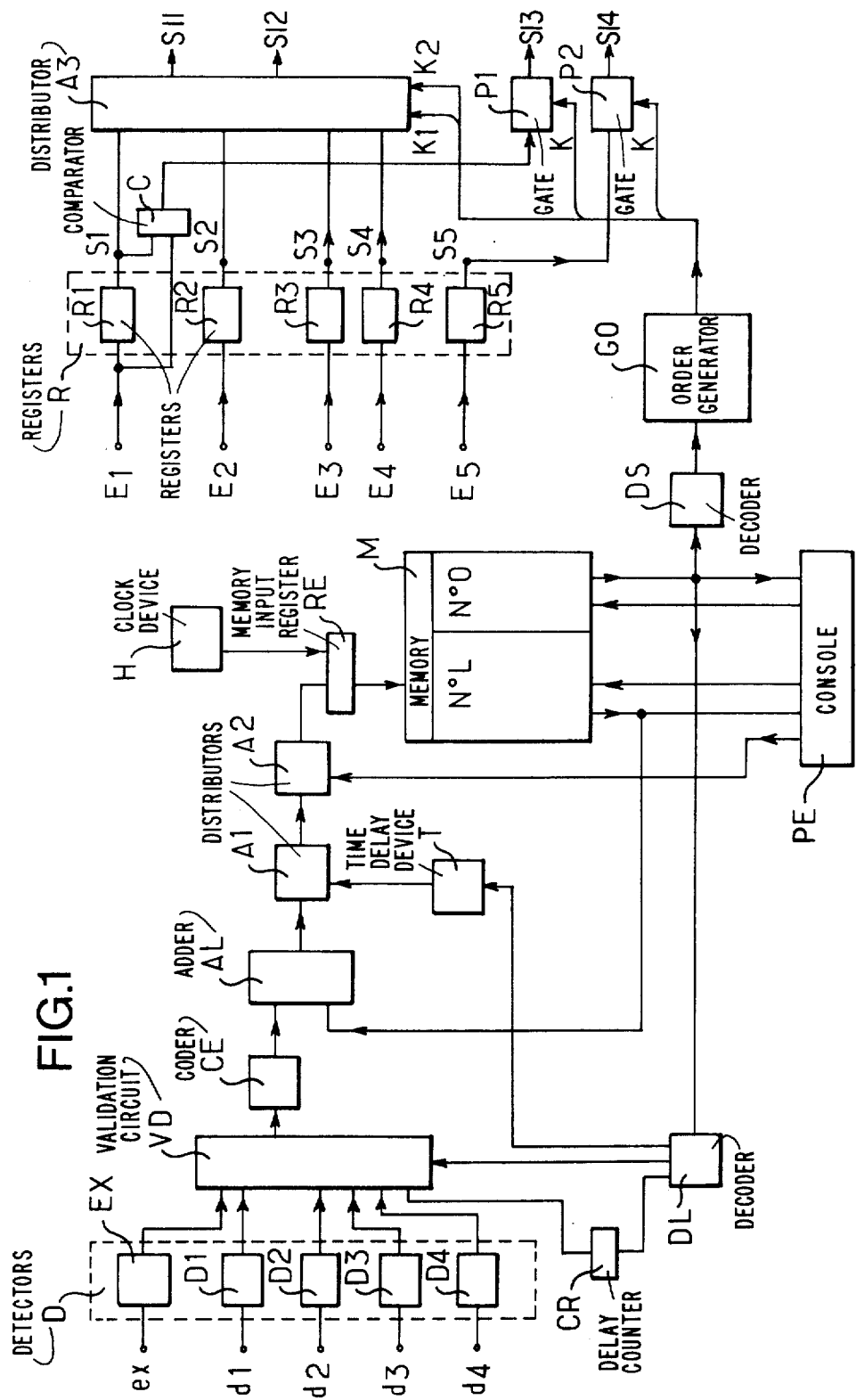
FIG. 1 shows diagrammatically the control system as a whole.

In the embodiment shown in FIG. 1, the memory used is a direct-access static memory M, formed, to great advantage, according to the MOS integrated circuit technique ("RAM-MOS" memory) comprising 512 lines of 16 be (binary elements); each line is composed of a line number No. L (9 binary elements for the binary coding of the 512 No. L) intended for the addressing of the following order and an order number No. O having 7 binary elements, making it possible to direct the order towards the element concerned. For that purpose, the 7 binary elements of the order are translated into decimal code by decoders DS and DL which may have a total of up to 128 outputs. These decoders are transistorized logic circuits of known type, formed, for example, according to the C/MOS technique, in which the binary elements are received in parallel at the input and enabling the marking of one of the outputs.

The output order decoder DS energizes an order generator GO which transmits the orders towards the elements to be controlled and the output orders for the data contained in the registers. That order generator is constituted by a set of transistorized flip-flops each controlled by two outputs of the decoder DS and each transmitting an order in the form of an electric polarity. These flip-flops enable a calibrating of the orders sent out by the generator, each flip-flop receiving successively an order for changing over to the set state and an order for returning to the reset position. The digital data used at a given instant are stored in a set of registers R comprising, for example, five registers R1 to R5. These registers are fed directly by the elements which contain the corresponding data. In that example, the inputs E1 to E5 and the outputs S1 to S5 are connected up in parallel, hence by harnesses comprising as many wires as there are binary positions in the registers. Registers with inputs in series and outputs in parallel or vice versa could also be used.

Figure 2:
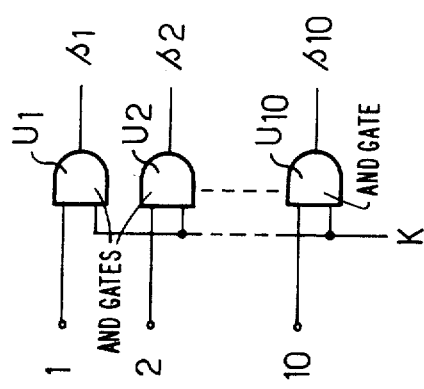
FIG. 2 is a type of gate used for transmitting an order.

When an element uses only data coming from a single register, for example register R5, the output of that register is controlled by a gate such as P2, formed, for example, by "AND" circuits. FIG. 2 shows a gate constituted by 10 "AND" circuits U1 to U10, enabling the transmitting of ten binary elements, applied to the points 1 to 10, on the outputs s1 to s10, on the receiving of an order at the point K common to one of the inputs of the 10 gates U1 to U10.

Figure 3:
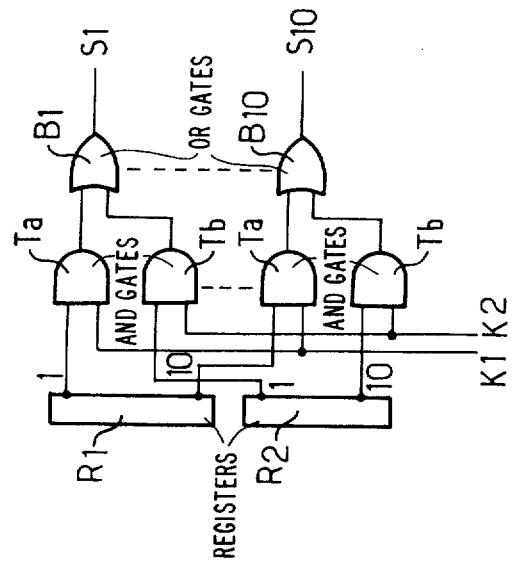
FIG. 3 shows a distributor used for directing the sending of the data contained in the registers.

When several registers can supply data to the same element, for example the registers R1 to R4, the output of the register chosen is controlled through a distributor A3. An example of a distributor is shown in FIG. 3 where the registers R1 and R2 each comprise, for example, ten binary positions from which the data can be sent on ten output wires $s1$ to $s10$. Each of these wires is controlled by an "OR" gate B1 to B10 energized by two "AND" gates T$a$ and T$b$, the first transmitting the data coming from R1 when an order is sent on the wire K1, the second transmitting the data coming from R2 on an order sent on the wire K2.

Figure 4:
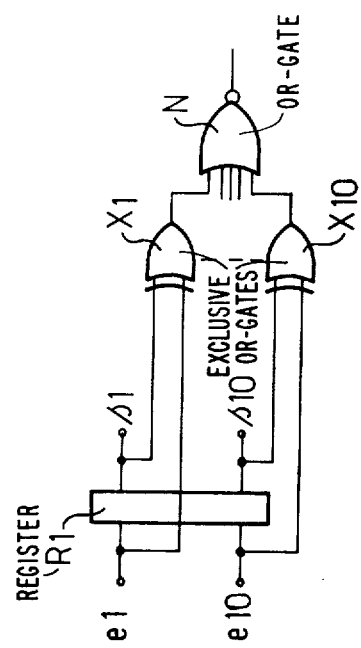
FIG. 4 is a comparator.

The controlling of certain rapid elements may require a previous phasing. To ensure, for example, before controlling an element by means of a gate P1 (similar to the gate P2 already described), that the data applied at the output of the register R1 is stable, a comparator C connected up between the input and the output of the register R1 and feeding the gate P1 only if the data existing at the input and at the output is identical, is used. An example of a comparator which may be used with a register R1 having 10 positions is shown in FIG. 4. It comprises ten "exclusive OR" gates X1 to X10 each energized by the input point $e$ and the output point $s$ corresponding to the same binary position of the register R1. The outputs of these 10 gates are connected to the inputs of a "NOR" gate N which sends out a signal only in the case where the data existing at the points $s1$ to $s10$ is identical to that which comes in at the points $e1$ to $e10$.

The second decoder (DL) decodes the reading orders sent to a validating element VD similar to the switch A3 shown in FIG. 3, which enables the reading of one of the detectors D1 to D5 of the detection assembly D. The detectors D1 to D5 receive from the elements which they supervise, at their inputs $d1$ to $d4$, state data which is characteristic of the state of these elements.

The data contained in the detector chosen by the validating element VD make it possible to send an order to the memory. That order is used for determining the increment to be added to the line number read in the memory to obtain the address of the following order. For that purpose, the outputs of each detector are connected, through the element VD, to the inputs of a coder CE of known type. That coder has one input per possible address increment and it transmits, at the output, in binary code, the value of the corresponding address increment, to the input marked by the detector which is authorized to transmit. The input of the marked coder depends simultaneously on the detector and on the data contained in that detector, this enabling very flexible programming.

The order is transmitted to the memory by the following process:

The binary coded address increment is sent to an adder AL which receives also from the memory M the address contained in the line being processed. The assembly constituted by the element VD, the coder CE and the line adder AL forms an analysis block controlled by a logic unit having several states. There are as many possible logic states for the same variable as inputs to the coder CE. The sending of an effective order to an input element or output element is effected with a very short sequence in a memory and even, in certain cases, by a single reading of the memory, where a binary logic unit would require a long analysis sequence.

At the output of the adder AL, the new line number is sent to an input register RE of the memory through two distributors A1 and A2 having the same design as the distributor A3 shown in FIG. 3.

The distributor A1 makes it possible to send an order from a time delay element T to allow the system to change over to another function if a blocking of the function in progress occurs, and the distributor A2 makes it possible to send out an order directly from the operation console PE. That console also makes it possible to enter the program into the memory, for example at the keyboard or by means of a punch tape or magnetic tape reader.

The rhythm of the addressing of the orders in the memory is regulated by an electronic clock H affecting the register RE.

In the case where the system allows the performing, from end to end, of several types of functions, for example in the case of the controlling of an automatic switch, the incoming or outgoing selections and the pre-selections, the detection assembly D may comprise a work scanning unit EX which will determine the next function to be performed. That scanning unit comprises a finder for each type of function, scanning the requests of the calling elements to perform that function and a device enabling the choice of the type of function.

In the case of an automatic switch, the finders could, in a known way, scan the selection and pre-selection requests and a priority circuit will indicate to the control system the order in which these various selections and pre-selections will be performed.

The system illustrated also makes it possible to remain on the same line in the memory during several cycles of the clock H which controls the input register. For that purpose, certain of the reading orders transmitted through the decoder DL are assigned to a time delay counter CR. That counter, on a reading order, is reset to zero and displays a time delay value. Throughout the duration of that time delay, the counter CR sends out to the adder AL, through the element VD and the coder CE, a value zero of the address increment. At the end of the time delay, CR may control any address increment.

The system according to the invention is produced preferably according to the integrated circuit technique, this imparting thereto a very slight volume. The memory, enabling, for example, the controlling of the telephone exchange of 4000 lines, uses a single plug-in type printed circuit card.

The main advantages of the invention in relation to a computer, that is, the simplicity of putting into service and the very low cost price, result from the use of a logic unit having several states making it possible to effect the analysis of the input data with a very much smaller number of stages than that required by a binary logic unit.

It must be understood that the invention is not limited to the application described. The technical means and technology used, more particularly the input means for the data and the control means for the controlled elements, may be adapted according to the nature of these elements, or replaced by equivalent means.

The invention is applicable in a general way in industries using machine tools, chemical or metallurgical production units, or electrical devices.

I claim:

1. Logic control system intended for controlling a set of elements by transmitting data and orders to the set of elements, more particularly for use in a telecommunication exchange, comprising:
   a directly addressable memory and associated addressing means,
   a set of input detectors receiving data concerning the state of the said elements,
   a set of registers for storing said data to be transmitted to said set of elements to be controlled, and output means connected to said set of registers and receiving as inputs the data stored in said registers for sending to said elements orders and data, said memory being composed of addressable lines, each containing a line number and a coded instruction word, which is sent to the said addressing means and output means, and the said addressing means comprising:

an address register connected to said memory, an adder having its output connected to said address register and one of its inputs connected to said memory, said adder receiving as one input a line number from said memory, a validation circuit, whose inputs are connected to the outputs of the said detectors, and controlled by instruction words each allowing the selection of at least one input detector, a coder, whose inputs are connected to the outputs of the validation circuit and delivering at its output a binary number to said adder to be added to said line number supplied to said adder from said memory in order to obtain the address of the next line to be read in the memory, said binary number from said coder corresponding to the address increment to said address of the next line to be read in the memory.

2. Control system according to claim 1, in which the said output means comprise a first order decoder connected to the output of said memory and an order generator connected to the output of said first order decoder, said order generator comprising flip-flops controlled by instruction words from said memory via said first order decoder, and each transmitting an order in the form of an electric polarity, said instruction words being received by said first order decoder the outputs of which are connected to the inputs of said flip-flops.

3. Control system according to claim 2, further comprising a second order decoder connected to the output of said memory and a time delay device using a counter, said delay device being connected up to said second order decoder and to said validation circuit for enabling the addressing in the memory of the same line number throughout the whole duration of the time delay, the duration of the time delay being determined by the order transmitted by the second order decoder to said counter.

4. Control system according to claim 2 wherein said output means further comprises at least one gate and a distributor said gate and distributor being controlled by the outputs of said first order generator wherein said gate is connected between an element to be controlled and a corresponding register of said set of registers, and wherein said distributor is connected between several of said elements to be controlled and a plurality of the registers of said set of registers.

5. Control system according to claim 2 wherein said output means further comprises at least one gate and at least one comparator, said gate being controlled by the outputs of said order generator, said comparator being connected to receive as inputs the input of a selected register and the output of a selected register, said gate being connected between an element to be controlled and the output of said comparator.

* * * * *